Sept. 10, 1935.  F. W. JACKMAN  2,013,886
COLOR SEPARATION FOR COMPOSITE MOTION PICTURES
Filed May 6, 1931
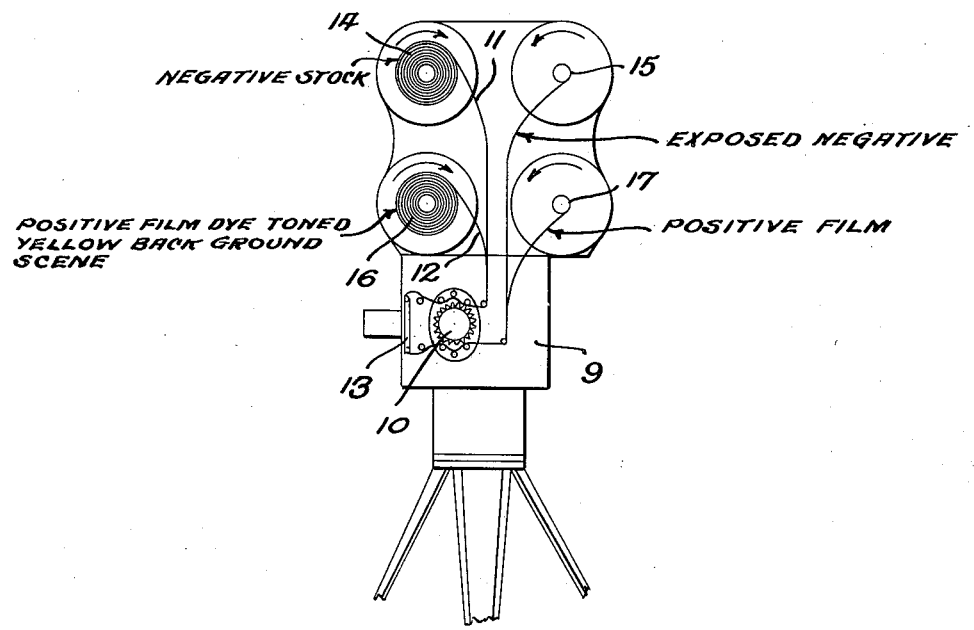
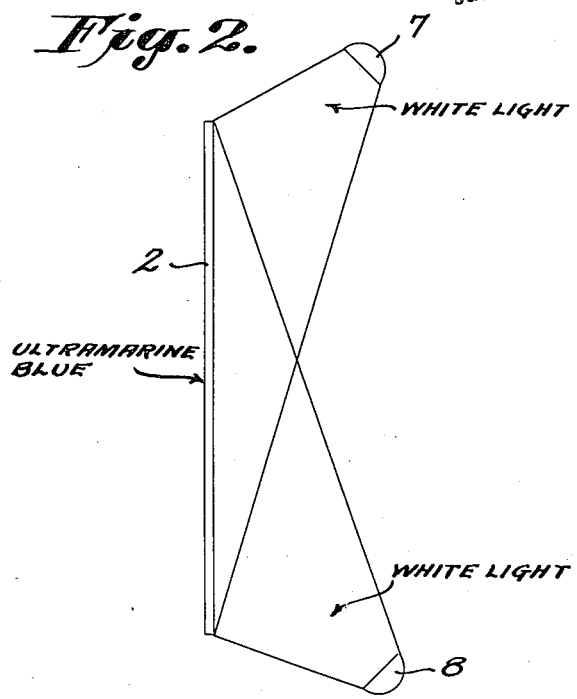
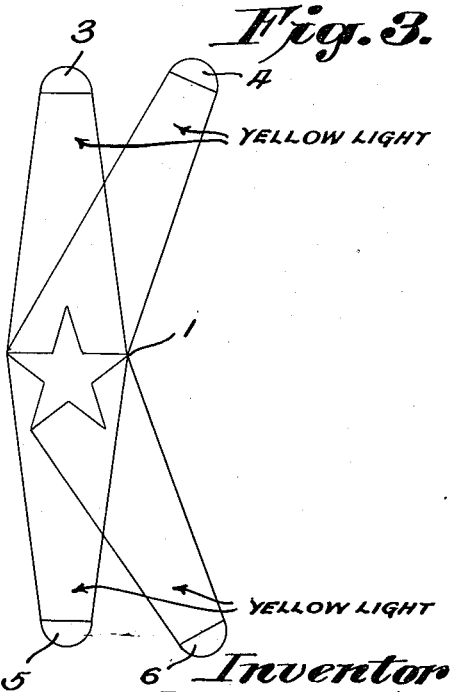
Inventor
Fred W. Jackman.
By W. E. Beatty
Atty.

Patented Sept. 10, 1935

2,013,886

UNITED STATES PATENT OFFICE 2,013,886

COLOR SEPARATION FOR COMPOSITE MOTION PICTURES

Fred W. Jackman, Beverly Hills, Calif., assignor to Warner Bros. Pictures, Inc., New York, N. Y., a corporation of Delaware Application May 6, 1931, Serial No. 535,505

2 Claims. (Cl. 88—16)

This invention relates to color separation for composite motion pictures wherein a background scene and a foreground or action component are photographed at different times and later photographically superposed from a single point of view and in a single step or operation to produce the final composite picture.

The embodiment chosen to illustrate the invention depends upon color separation for combining the component parts of the picture into the composite picture. That is to say, the foreground scene such as actors or the like, is illuminated with light of a selected color before a ground or canvas drop which emits light of another color. The camera contains a background scene in the same color as the light employed for illuminating the foreground. This background scene, usually in the form of a transparency, is placed in the camera before the negative film which is to carry the composite picture exposure. Various other processes depending on color separation have also been proposed for making composite pictures.

It has heretofore been proposed to carry out such processes with blue light on the action or foreground, the ground being red and illuminated with red light, and with a blue background scene in the camera in front of the negative film. I have discovered that this has several defects, among which are: (1) the lack of uniform transparency of the blue background scene or transparency to blue light from the action, causing an impression of the background scene to show through the foreground scene on the composite picture; and (2) overemphasis and distortion of the tones in the background scene as the red printing light from the ground fails to print the blue background scene to accurately reproduce the original undyed background scene.

An object of the present invention is to avoid the defects above noted. This is accomplished by illuminating the foreground or action with yellow light, by employing a yellow image of the background scene and by providing a ground having an ultramarine blue color. I have discovered that a yellow transparency or background image is uniformly transparent to yellow light, whereas a blue transparency is not uniformly transparent to blue light, also a blue transparency in combination with a red printing light does not accurately reproduce the shades of tone in the original undyed background image.

For further details of the invention, reference may be made to the drawing, in which Fig. 1 is a diagrammatic view of a camera employed in the invention;

Fig. 2 is a diagrammatic drawing of a ground component; and

Fig. 3 is a diagrammatic drawing of an action component.

Referring to the drawing, the action 1 (which may be actors or the like) is positioned about 15 ft. in front of a ground 2. The action 1 is illuminated with yellow light by the lamps 3, 4, 5 and 6, and the ground 2 reflects a complementary color—ultramarine blue. The ground 2 may consist of a sheet of canvas dyed ultramarine blue and illuminated with white light by the lamps 7 and 8.

The use of ultramarine blue and yellow as complementary colors has certain advantages above described.

The lamps 7 and 8 are so arranged that they do not directly illuminate the action 1, and the lamps 3, 4, 5 and 6 are so arranged that they do not illuminate the ground 2.

The action 1 is photographed before the ground when arranged as described, by means of the camera 9 containing a sprocket 10 for feeding the films 11 and 12 through the film gate 13. The film 11 is panchromatic negative stock and is taken from the supply reel 14 and wound up on the take-up reel 15. The film 12 is a positive film of the desired background scene which has been dye-toned pure yellow, the same color as that employed to illuminate the action 1. By "dye-toned" I mean that the silver deposit of the image is replaced with dye. The film 12 is taken from the supply reel 16 and taken up on the take-up reel 17. Preferably, the films 11 and 12 are so positioned on the reels that their emulsion faces are in contact in passing through the film gate 13.

It is necessary to modify certain of the cameras now on the market in order that they may be adapted for the purpose above described. For instance, it is necessary with some cameras to increase the depth of the film channel in the film gate in order that it may accommodate two films instead of one. Furthermore, the final negative being removed from the lens the thickness of a film, it is necessary to move the ground glass of the view-finder away from the lens a corresponding distance in order that the ground glass may be positioned at the same distance from the lens as the negative film. This may be conveniently done by inserting in front of the ground glass a shim, or thin piece of metal, the thickness of the film 12.

The yellow light reflected from the action 1 passes substantially unimpeded through the yellow background scene on the film 12 and impresses its image on the negative film 11. The action 1 intercepts the light immediately behind it and reflected from the ground 2. The light reflected from the remainder of the ground 2 serves to print on the negative film 11 that part of the background scene where the image of the action 1 does not exist.

It will be apparent, therefore, that the invention provides for photographing composite motion pictures in a single step or operation.

It will be apparent to those skilled in the art that various modifications within the scope of my invention may be made.

I claim:

1. The method of making composite photographs comprising exposing a light sensitive surface behind a yellow dyetoned transparency of a background component, to an action component positioned before an ultramarine blue ground, and illuminating said action component with yellow light of a color substantially the same as the color of the image on said transparency, said yellow color being complementary to said ultramarine blue.

2. The method according to claim 1 which comprises illuminating said ultramarine blue ground with white light.

FRED W. JACKMAN.